(12) United States Patent
Rossin

(10) Patent No.: US 6,509,511 B1
(45) Date of Patent: *Jan. 21, 2003

(54) PROCESS FOR THE CONVERSION OF PERFLUOROALKANES, A CATALYST FOR USE THEREIN AND A METHOD FOR ITS PREPARATION

(75) Inventor: Joseph Anthony Rossin, Columbus, OH (US)

(73) Assignee: Guild Associates, Inc., Dublin, OH (US)

( * ) Notice: Subject to any disclaimer, the term of this patent is extended or adjusted under 35 U.S.C. 154(b) by 92 days.

This patent is subject to a terminal disclaimer.

(21) Appl. No.: 09/168,302

(22) Filed: Oct. 7, 1998

(51) Int. Cl.$^7$ .................................................. A62D 3/00
(52) U.S. Cl. ........................ 588/205; 588/206; 588/213; 423/240 R; 423/240 S
(58) Field of Search ................................ 588/205, 206, 588/207, 258, 261, 213; 423/628, 624, 625, 631, 210, 240 R, 240 S; 502/332, 300, 355, 400, 414, 415

(56) References Cited

U.S. PATENT DOCUMENTS

| | | | |
|---|---|---|---|
| 3,760,565 A | | 9/1973 | Fish .............................. 55/71 |
| 3,899,444 A | * | 8/1975 | Stephens ................. 252/455 R |
| 3,980,584 A | | 9/1976 | Dronov et al. .............. 252/432 |
| 3,983,072 A | | 9/1976 | Stephens .................... 252/466 |
| 4,053,557 A | | 10/1977 | Kageyama |
| 4,059,683 A | | 11/1977 | Lindberg et al. ............ 423/481 |
| 4,092,403 A | | 5/1978 | Rectenwald et al. ........ 423/488 |
| 4,390,456 A | * | 6/1983 | Sanchez et al. ............. 252/448 |
| 4,435,379 A | | 3/1984 | Olson et al. |
| 4,459,372 A | | 7/1984 | Arenn |
| 4,587,116 A | | 5/1986 | Livingston et al. |
| 4,810,685 A | * | 3/1989 | Twigg et al. ................. 502/60 |
| 4,868,150 A | * | 9/1989 | Spooner et al. ............. 502/439 |
| 4,902,664 A | * | 2/1990 | Wan ........................... 502/300 |
| 5,151,263 A | | 9/1992 | Okazaki et al. |
| 5,176,897 A | | 1/1993 | Lester ........................ 423/659 |
| 5,276,240 A | | 1/1994 | Timmons et al. |
| 5,276,249 A | | 1/1994 | Greene et al. |
| 5,283,041 A | | 2/1994 | Nguyen et al. |
| 5,290,429 A | | 3/1994 | Delaney et al. ............. 208/145 |
| 5,396,022 A | | 3/1995 | Wu et al. |
| 5,416,247 A | | 5/1995 | Webster ....................... 588/206 |
| 5,430,230 A | | 7/1995 | Mitsui et al. ............... 588/206 |
| 5,457,268 A | | 10/1995 | Greene et al. |
| 5,593,654 A | * | 1/1997 | Decker, Jr. et al. ......... 423/625 |
| 5,622,682 A | | 4/1997 | Tom ........................... 423/230 |
| 5,653,949 A | | 8/1997 | Chen et al. ................. 423/240 S |
| 5,817,284 A | | 10/1998 | Nakano et al. ............ 423/240 S |
| 5,863,515 A | * | 1/1999 | Davis et al. ................. 423/628 |
| 6,022,489 A | * | 2/2000 | Izumikawa et al. ..... 252/182.32 |
| 6,023,007 A | * | 2/2000 | Nakajo et al. ............... 588/205 |
| 6,069,291 A | * | 5/2000 | Rossin et al. ............... 588/206 |
| 6,110,436 A | | 8/2000 | Scholz et al. ............... 423/240 |
| 6,162,957 A | | 12/2000 | Nakajo et al. ............... 588/205 |

FOREIGN PATENT DOCUMENTS

| | | | |
|---|---|---|---|
| EP | 0475422 A1 | 3/1992 | |
| EP | 0475442 | 3/1992 | |
| EP | 0 885 648 A1 | 12/1998 | ........... B01D/53/86 |
| GB | 2066690 | 7/1981 | |
| JP | 07080303 | 3/1995 | ............. B01J/23/24 |
| JP | 9-253453 | 9/1997 | ........... B01D/53/94 |
| JP | 10192653 | 7/1998 | ........... B01D/53/86 |

OTHER PUBLICATIONS

Langan, et al., "Strategies for greenhouse gas reduction," Solid State Technology, pp. 115–122 (Jul. 1996).

Okazaki & Kurosaki; Decomposition of Chlorofluorocarbons by the Reaction with Water Vapor Catalyzed by Iron Oxide Supported on Activated Carbon, pp. 1901–1904, Chemistry Letters 1989.

EP 91 11 5582, Dec. 9, 1991 (This is the Search Report for EP 475 442).

PCT/US 99/21376.

Japanese Abstract of JP9057103.

Japanese Abstract of JP57007255.

Japanese Abstract of JP57007254.

Japanese Abstract of JP9253453.

Japanese Abstract of JP10066867.

Karmakar & Green, An Investigation of CFC12 ($CCL_2F_2$) Decomposition on $TiO_2$ Catalysts, J. Catal., 1995, p. 394 Academic Press, San Diego.

Bickle et al, Catalytic Destruction of Chlorofluorocarbons and Toxic Chlorinated Hydrocarbons, Appl. Catal. B:Env., 1994, p. 141, Elsevier, Amsterdam.

Fan & Yates, Infared Study of the Oxidation of Hexafluoropropene On $TiO_2$, J. Phys. Chem. 1994, p. 1061, Americal Chemical Society, Easton, PA.

Farris et al, Deactivation of a Pt $Al_2O_3$ Catalyst During the Oxidation of Hexafluoropropylene, Catal. Today, 1992, p. 501, Elsevier, Amsterdam.

(List continued on next page.)

Primary Examiner—Stanley S. Silverman
Assistant Examiner—Eileen E. Nave
(74) Attorney, Agent, or Firm—Baker Botts L.L.P.

(57) ABSTRACT

A process for the decomposition of perfluoroalkanes comprises contacting a gaseous stream comprising the perfluoroalkanes with a catalyst comprising alumina. The alumina is prepared from one or more alumina sources, one of which is aluminum nitrate. The catalyst preferably comprises stabilizing agent, in particular zirconium oxide or cobalt, preferably both. The catalyst is prepared by forming a slurry of aluminum nitrate, optionally with one or more additional sources of alumina, in a suitable solvent, such as water. The resulting mixture is dried and calcined to yield the finished catalyst. The stabilizing agent or a precursor thereof may be included in the mixture or impregnated into the finished catalyst.

14 Claims, No Drawings

OTHER PUBLICATIONS

Campbell & Rossin, Catalytic Oxidation of Perfluorocyclobutene over a Pt TiO$_2$ Catalyst, paper presented at 14$^{th}$ N. Amer. Catalysis Society Meeting, 1995.

Burdeniuc & Crabtree, Mineralization of Chlorofluorocarbons and Aromatization of Saturated Fluorocarbons by a Convenient Thermal Process, Science, 1996, p. 340, Amer. Assoc. for the Advancement of Science, D.C.

Nagata et al, Catalytic Oxidative Decomposition of Chlorofluorocarbons (CFCs) in the Presence of Hydrocarbons, Applied Catalysts B: Environmental, 1994, pp. 23–31, Elsevier, Amsterdam.

Bond & Sadeghi, Catalysed Destruction of Chlorinated Hydrocarbons J. Appl. Chem. Biotechnol. 1975, pp. 241–248, Society of Chemical Industry, London.

* cited by examiner

PROCESS FOR THE CONVERSION OF PERFLUOROALKANES, A CATALYST FOR USE THEREIN AND A METHOD FOR ITS PREPARATION

FIELD OF THE INVENTION

The present invention relates to process for the decomposition of fluorine-containing compounds, in particular perfluoroalkanes, a catalyst for use in such a process for preparing the catalyst.

BACKGROUND OF THE INVENTION

Fluorine-containing compounds represent a group of compounds which can display a high level of stability, making them difficult to convert or decompose. As a result, these compounds can be difficult to remove from effluent and waste gas streams before such streams are released into the atmosphere. A particularly troublesome group of compounds to decompose or convert are the perfluoroalkanes.

Perfluoroalkanes are a specific group of halogen-containing compounds that consist of carbon and fluorine atoms. Perfluoroalkanes are saturated, that is they do not possess double or triple carbon-carbon bonds. Perfluoroalkanes differ from chlorofluorocarbons (CFC's), hydrochlorofluorocarbons (HCF's) and hydrofluorocarbons (HFC's) in that perfluoroalkanes contain neither hydrogen nor chlorine. Examples of operations which emit perfluoroalkanes to the environment include, but are not limited to, electrolytic aluminum smelting, manufacture of fluoroplastics, dry chemical etching, chamber cleaning process and semiconductor manufacturing process. Examples of perfluoroalkanes include carbon tetrafluoride ($CF_4$) hexafluoroethane ($C_2F_6$), octafluoropropane ($C_3F_8$), octafluorocyclobutane ($C_4H_8$) and decafluorobutane ($C_4H_{10}$). Perfluoroalkanes are some of the most stable compounds known (Kiplinger et al. Chem. Rev., p.373 (1994). As a result, these compounds are efficient as so-called "green house" gases, with global warming potentials estimated to be many times that of $CO_2$ (Langen et al., 1996). The stability of perfluoroalkanes makes these compounds difficult to decompose or convert to useful products, such as for example by conversion of perfluoroalkanes to perfluoroalkenes.

A number of catalysts and catalytic processes have been reported for the decomposition of halogen-containing organic compounds. A review of the literature reveals that the majority of these catalysts and catalytic process focus on the decomposition of chlorine-containing compounds, or organic compounds containing both chlorine and fluorine. Only limited results have been reported on the decomposition of organic compounds containing only fluorine. Bond and Sadeghi, in an article entitled "Catalyzed Destruction of Chlorinated Hydrocarbons," *J. Appl. Chem. Biotechnol.*, p.241 (1975), report the decomposition of chlorinated hydrocarbons over a platinum catalyst supported on high surface area alumina. In particular, experiments are reported on the conversion of a range of chlorinated hydrocarbons over a platinum/gamma-alumina catalyst on which a hydrocarbon fuel is being oxidized. The ability of this catalyst to decompose perfluoroalkanes was not reported.

Kamaker and Green, in an article entitled "An investigation of carbon difluoridedichloride ($CF_2Cl_2$) decomposition on $TiO_2$ Catalyst," *J. Catal*, p394 (1995), report the use of a $TiO_2$ catalyst to decompose $CFCl_2$ at reaction temperatures between 200 and 400° C. in streams of humid air. Again, there is no discussion of the decomposition or conversion of perfluoroalkanes.

Bickel et al., in an article entitled "Catalytic Destruction of Chlorofluorocarbons and Toxic Chlorinated Hydrocarbons," *Appl. Catal., B:Env.* p.141 (1994), report the use of a platinum supported on phosphate-doped zirconium oxide for the decomposition of CFC113 ($Cl_2FCCClF_2$) in air streams. The catalyst was able to achieve in excess of 95% decomposition of CFC113 at reaction of 500° C. for approximately 300 hours of continuous operation. After this time, the catalyst rapidly deactivated. The ability of this catalyst to decompose perfluoroalkanes was not reported.

Fan and Yates, in an article entitled "Infrared Study of the Oxidation of Hexafluoropropene in $TiO_2$," *J. Phys. Chem*, p. 10621 (1994), report the decomposition of a perfluoroalkene over $TiO_2$. Perfluoroalkanes differ from perfluoroalkanes in that they contain a carbon-carbon double bond, that is are unsaturated. Although the catalyst was able to readily decompose hexafluoropropylene ($C_3F_6$), the loss of titanium, as $TiF_4$, was evident. The formation of $TiF_4$ would undoubtedly lead to deactivation of the catalyst. The ability of this catalyst to decompose perfluoroalkanes was not reported.

Faris et a., in an article entitled "Deactivation of a $Pt/Al_2O_3$ Catalyst During the Oxidation of Hexafluoropropylene," *Catal. Today*, p. 501 (1992), report the decomposition of hexafluoropropylene over a catalyst comprising platinum supported on a high surface area alumina. Although the catalyst could readily decompose hexaflurorpropylene at reaction temperatures between 300 and 400° C., over the course of the experiment (less than 100 hours), the aluminum oxide was converted to aluminum triflouride, which resulted in a severe loss of catalytic activity. The ability of this catalyst to convert perfluoroalkanes was not reported. However, transformation of the aluminum oxide to aluminum triflouride suggests that aluminum oxides will not be stable in fluorine-containing environments.

Campbell and Rossin, in a paper entitled "Catalytic Oxidation of Perfluorocyclobutene over a $Pt/TiO_2$ Catalyst," presented at the 14th N. Am. Catal. Soc. Meeting (1995), report the use of a platinum/$TiO_2$ catalyst to decompose perfluorocyclobutene ($C_4F_6$) at reaction temperatures between 320 and 410° C. The authors note that even at a reaction temperature of 550° C., no conversion of perfluorocyclobutane (c-$C_4F8$), a perfluoroalkane, could be achieved using the $Pt/TiO_2$ catalyst. Results presented in this study demonstrate that perfluoroalkane are significantly more difficult to decompose or convert than the corresponding perfluoroalkane.

Nagata et al, in a paper entitled "Catalytic Oxidative Decomposition of Chlorofluorocarbons (CFC'ss) in the Presence of Hydrocarbons," *Appl. Catal. B:Env.*, p. 23 (1994), report the decomposition of 1,1,2-trichloro-1,2,2-trifluoroethane (CFC113), 1,2-dichloro-1,1,2,2-tetrafluoroethane (CFC114) and chloropentafluoroethane (CFC115) in the presence of hydrocarbons using catalyst prepared by impregnating a range of support materials, in particular gamma-alumina, silica-alumina, zeolites, mordenite, ferrierite, with vanadium, molybdenum, tungsten and platinum. Silica was also employed as a catalyst. Tungsten (VI) oxide and vanadium (V) oxide catalyst exhibited the highest activity. The decomposition of the CFC's became more difficult as the number of carbon atoms in the CFC molecule decreased. The ability of the catalyst to decompose or convert perfluoroalkanes was not reported. However, results suggest that the parent molecule becomes more difficult to destroy upon replacement of chlorine with fluorine. No information regarding the stability of the catalyst was reported.

Burdeniuc and Crabtree, in an article entitled "Mineralization of Chlorofluorocarbons and Aromatization of Saturated Fluorocarbons by a Convenient Thermal Process," Science, p. 340 (1996), report the transformation of cyclic perfluoroalkanes to perfluoroarenes by means of contact with sodium oxalate to yield sodium fluoride as a reaction product. Both reactions, however, are slow and non-catalytic, since sodium oxalate is stoichiometrically consumed by being converted into sodium fluoride during the course of the reaction. This process would not be able to decompose or convert perfluoroalkanes present in streams of air, since the oxygen and/or moisture in the air would readily convert the sodium oxalate to sodium oxide.

Accordingly, it can be seen that there exists a need for a process for the conversion of perfluoroalkanes present in effluent gaseous streams, in particular streams containing perfluoroalkanesin a mixture with air. Pending U.S. patent application Ser. No. 08/662129 concerns a process for the decomposition of perfluoroalkanes in which the perfluoroalkanes are contacted with a catalyst comprising aluminum oxide. The aluminum oxide is preferably stabilized by the presence of an element selected from barium, calcium, cerium, phosphorus, chromium, cobalt, iron, lanthanum, magnesium, nickel, tin, titanium and zirconium. The catalyst is prepared by preparing a slurry of a single source of aluminum oxide, specifically pseudoboehmite, and peptizing using an acid, such as nitric acid, formic acid or acetic acid. The resulting mixture, including one or more stabilizers if desired, is then dried and calcined. A very high activity of the catalyst in the decomposition of perfluoroalkanes is demonstrated in the specific examples of the specification.

In addition to high activity, a most important aspect of any catalyst, particularly a catalyst for use on a commercial scale, is the stability of the catalyst and its ability to maintain a high level of activity for extended periods of operation. Surprisingly, it has been found that the stability of an aluminum oxide-based catalyst in the decomposition of perfluoroalkanes can be markedly increased by employing aluminum nitrate as the aluminum oxide source.

BRIEF DISCLOSURE OF INVENTION

In a first aspect, the present invention provides a process for the decomposition of perfluoroalkanes, which process comprise contacting a stream of gas containing one or more perfluoroalkanes with a catalyst comprising alumina at an elevated temperature in the presence of water, the alumina having been prepared using aluminum nitrate as a source for the alumina. The catalyst preferably comprises alumina prepared from aluminum nitrate and one or more further sources of alumina, for example pseudoboehmite. The catalyst preferably comprises a stabilized alumina preferred stabilizers being selected from the group consisting of barium, calcium, cerium, phosphorus, chromium, cobalt, iron, lanthanium, magnesium, nickel, tin, titanium and zirconium. More preferably the alumina is stabilized with zirconium oxide or cobalt. A preferred catalyst comprises alumina stabilized with both zirconium oxide and cobalt.

Preferably the stream of gas being processed comprises an oxidizing agent, such as oxygen, in addition to the perfluoroalkanes and water.

In a further aspect, the present invention provides a catalyst for use in a process for the decomposition of perfluoroalkanes, which catalyst comprises alumina, the alumina having been prepared from aluminum nitrate. The alumina is preferably prepared using aluminum nitrate and one or more alumina sources or precursors. The alumina is preferably stabilized with one or more components selected from the aforementioned group.

In still a further aspect, the present invention provides a method for the preparation of a catalyst of use in a process for the decomposition of perfluoroalkanes, which method comprises forming a mixture by combining aluminum nitrate, optionally together with one or more other alumina sources or precursors, and a solvent, drying the mixture to remove the solvent and calcining the resulting material. The mixture may comprise one or more compounds of the components indicated hereinbefore as being stabilizers for the alumina. Alternatively, the stabilizing agent may be added to the calcined material by techniques well known in the art.

DETAILED DESCRIPTION OF INVENTION

The present invention provides a process for the decomposition of perfluoroalkanes, in which a gaseous stream containing one or more perfluoroalkanes is contacted with a catalyst comprising alumina at an elevated temperature in the presence of water. It has surprisingly been found that by contacting perfluoroalkanes with a catalyst comprising alumina prepared from aluminum nitrate, a very high conversion of the perfluoroalkanes to acceptable products, such as carbon dioxide and hydrogen fluoride, can be achieved, while at the same time maintaining a high level of catalyst activity. It has been found that alumina is active in catalyzing the decomposition of perfluoroalkanes in the presence of water. However, while possessing very high levels of catalytic activity, the alumina is quickly deactivated in the presence of perfluoroalkanes. The rate of deactivation would be problematic if use of such as process on a commercial scale were to be considered. However, it has been found that alumina prepared using alumina nitrate retains a very high level of activity for the decomposition of perfluoroalkanes for a prolonged period of time. The activity remains high for a sufficient length of time that the decomposition of perfluoroalkanes on a commercial scale is now feasible.

Water present in the gaseous stream reacts with the perfluoroalkanes to yield carbon monoxide (CO), carbon dioxide ($CO_2$) and hydrogen fluoride (HF) as the products of the process. Water may be added directly to the stream being processed, if not already present in sufficient amounts. Alternatively, the required amount of water may be formed in the process, for example by the oxidation of hydrocarbons. Preferably, the gaseous stream containing one or more perfluoroalkanes is contacted with the catalyst in the presence of an oxidizing agent. The preferred oxidizing agent is oxygen, most conveniently provided by adding air to the gaseous stream before contact with the catalyst. Other oxidizing agents include oxides of nitrogen and sulfur. The presence of an oxidizing agent is particularly preferred when the gasesous stream comprises perfluoroalkanes having 2 or more carbon atoms. In such cases, the presence of the oxidizing agent acts to convert carbon monoxide, produced by the reaction of the perfluoroalkanes with water, to carbon dioxide and assists in reducing the amount of carbon monoxide in the effluent of the process. The presence of an oxidizing agent is especially preferred in casses where the emission of high concentrations of carbon monoxide can not be tolerated or where further processing facilities for removing carbon monoxide from the effluent gas are not available.

The perfluoroalkanes are contacted with the catalyst at an elevated temperature. The minimum operating temperature will be determined by the activity of the particular catalyst being employed, the perfluoroalkanes composition of the gaseous stream and the level of decomposition required during the process. The temperature is preferably at least 400° C., more preferably at least 550° C. Temperatures of a least 600° C. are especially preferred. The upper limit of the range of operating temperatures will be determined by the process configuration being employed. However, it has been found that it is possible using the process the present invention to maintain temperatures below about 1000° C. and still obtain a very high conversion of the perfluoroalkanes in the gaseous stream. It is preferred to operate the process below 900° C., with almost complete decomposition being obtainable at temperatures at low as 750° C. in many cases. Accordingly, the range of operating temperatures for the process is preferably from 400° C. to 1000° C. more preferably from 550° C. to 900° C., with temperatures in the range of from 600° C. to 750° C. being especially preferred.

The process of the present invention may be operated at any suitable pressure. Typical operating pressures are in the range of from atmospheric pressure to 500 psi, preferably from atmospheric pressure to 300 psi. It is preferred that the operating pressure is of the order of atmospheric pressure.

The flow rate of the gaseous stream should be sufficient to achieve the desired level of decomposition of the perfluoroalkanes and will be related to the operating temperature and pressure of the process, together with the particular catalyst configuration employed. The gas hourly space velocity (GHSV) of the gaseous stream may range from 500 $hr^{-1}$ to 50,000 $hr^{-1}$, more preferably from 1,000 $hr^{-1}$ to 30,000 $hr^{-1}$.

The reactor configuration used for the process of the present invention may be selected from a variety of configurations allowing for a gaseous stream to contact a solid catalyst, for example a fixed bed, fluidized bed, moving bed and spinning basket. The process may operate as a one-pass process or as a multi-pass process, with the gaseous stream being recycled so as to contact the catalyst a plurality of times. The number of passes in a multi-pass process configuration will be determined by the level of activity of the catalyst, the concentration of perfluoroalkanes in the feed gas and the desired or permitted concentration of perfluoroalkanes in the effluent stream.

The process of the present invention may also be used to treat gas streams containing, in addition to one or more perfluoroalkanes, other organic compounds, such as for example perfluoroalkanes, hydrofluorocarbons, and hydrocarbons, such as for example alkanes, alkenes, aromatics and oxygenates. Specific examples of further compounds which may be present in the stream being treated include trifluoromethane, hexafluroethane and perfluoroisobutene.

Liquid perfluoroalkanes may be decomposed using the process of the present invention by injecting the perfluoroalkanes in the liquid state into a gas stream comprising an inert carrier gas, for example nitrogen, water and, if preferred, an oxidizing agent. The resulting stream is then contacted with the catalyst of the present invention as described hereinbefore.

It should also be noted that after the gas stream has been treated in accordance with the present invention, further treatment, if desired, may be necessary to remove hydrofluoric acid from the effluent stream. If the concentration of hydrofluoric acid in the effluent stream is deemed unacceptable, conventional collection or abatement processes, such as caustic scrubbing, may be employed to avoid venting acid gases directly into the atmosphere.

Under certain operating conditions, for example when processing streams containing significant concentrations of perfluoroalkanes, such as greater than about 3,000 to 5,000 ppm, perfluoroalkanes, the life-time of the catalyst may still be such as to warrant replacement of the catalyst following a relatively short period of operation. Should this be the case, the catalyst may be used to treat process streams containing perfluoroalkanes using a fluidized bed reactor configuration employing catalyst particles of a fluidizable size. This reactor configuration would allow for readily removing catalyst from the reactor during process operation while simultaneously adding fresh catalyst in order to maintain the required level of catalyst activity in the reactor.

The catalyst employed in the process of the present invention comprises alumina (aluminum oxide $Al_2O_3$). The alumina is prepared from aluminum nitrate. Additional alumina sources or precursors may also be used, in addition to aluminum nitrate, in order to prepare the alumina of the catalyst. Other suitable alumina sources include alumina itself in one or more forms, such as pseudoboehmite, and bayerite. Alternatively, the alumina source may be a precursor of alumina, such as aluminum hydroxide, aluminum sulfate and aluminum chloride. A preferred catalyst comprises alumina prepared from pseudoboehmite and aluminum nitrate.

The alumina is preferably stabilized by one or more stabilizing agents. The term "stabilizing agent" is used to refer to a component which does not significantly affect the activity of the alumina, but which significantly increases the active life of the catalyst in the conversion of perfluoroalkanes. Suitable stabilizing agents include barium, calcium, cerium, phosphorus, chromium, cobalt, iron, lanthanum, magnesium, nickel, tin, titanium and zirconium The stabilizing agents may be present as the metal, or as one or more compounds thereof, such as an oxide. Preferred stabilizing agents are zirconium oxide ($ZrO_2$) and cobalt (Co). A particularly preferred catalyst comprises both zirconium oxide and cobalt as stabilizing agents.

If a stabilizing agent is present, it is preferably present in an amount of from 1 to 100 parts by weight per 100 parts by weight of alumina, more preferably from 3 to 20 parts by weight per 100 part by weight of alumina. Zirconium oxide when present as the stabilizing agent is preferably present in an amount of from 1 to 100 parts by weight per 100 parts by weight of alumina, more preferably from 3 to 20 parts by weight per 100 parts by weight of alumina. Cobalt, when present in the catalyst, is preferably present in an amount of from 5 to 25 parts by weight per 100 parts by weight of alumina, more preferably 3 to 10 parts by weight pre 100 parts by weight of alumina.

The catalyst may be used in any suitable configuration which exposes sufficient catalyst surface to the gaseous stream being treated. Any of the forms of catalyst known in the art may be employed, for example pellets, granules, rings, spheres or cylinders. Alternatively, the catalyst configuration may comprise the alumina catalyst supported on an inert carrier, for example a ceramic foam, spheres or monoliths. The monolithic catalyst configuration may be preferred when it is desired to operate the process of the invention with a minimum pressure drop through the catalyst or when it is required to minimize catalyst attrition or dusting.

In a further aspect, the present invention provides a method for preparing a catalyst for use in the conversion of perfluoroalkanes. The catalyst may be prepared by first preparing a slurry of the alumina sources or precursors in a suitable solvent. Suitable solvents include water, alcohols, such as ethanol, and other solvents which allow for gellation of the alumina source. A most convenient solvent is water. Suitable mixers for preparing the slurry as well known and available in the art. Most suitable mixers include a muller and a dispersing mixer. The required amount of the stabilizing agent or a precursor thereof., if being employed, may be added to the slurry at this stage. Suitable precursors include acetates, oxalates oxides, hydroxides, nitrates, oxynitrates and mixtures thereof. Zirconium oxynitrate is a most preferred stabilizing agent precursor. The resulting mixture is peptized by the addition of an acid as a peptizing agent. Suitable acid peptizing agents include acetic acid, citric acid, formic acid, hydrofluoric acid, nitric acid, and sulfuric acid, with nitric acid being the preferred peptizing agent. The pH of the mixture is lowered to a sufficient degree to peptize the alumina sources. Preferably the pH is reduced to a value in the range of from 2.0 to 5.0. Once peptizing is complete, the mixture is neutralized by the addition of a base to bring the pH into the range of from 5.0 to 10.0, more preferably from 6.0 to 8.0. Suitable bases for neutralizing the mixture include ammonia, diethylamine, and pyridine, with ammonia being the preferred base. If the mixture contains an acidic compound as a precursor for alumina or for the stabilizing agent, the need for the addition of an acid may be dispensed with. Examples of such compounds include some acetates, oxides, hydroxides and oxynitrates. Once the mixture containing such a compound has been prepared and the necessary time for peptizing allowed to elapse, the mixture is neutralized as described above.

The resulting mixture is mixed thoroughly, preferably for a period of from 1 hour to up to 3 days. Thereafter, the resulting gel may be aged by being left to stand for a period of up to 3 days. Following mixing and, if appropriate aging, the mixture is dried by heating to evaporate the solvent. Finally, the mixture is calcined by heating in a calcining oven to a temperature in the range of from 400° C. to 750° C. for a period of from 1 to 10 hours. Calcining is preferably carried out in an oxygen-containing atmosphere, most conveniently under an atmosphere of air.

The resulting composition may be crushed and sieved to yield particles of a suitable size for use directly in the process of the present invention. Alternatively, the resulting composition may be processed into alternative catalyst forms, for example pellets, beads, spheres and extrudates, using processes well known and familiar to the person skilled in the art. As a further alternative, the resulting gel may be washcoated onto a support, such as a ceramic foam, spheres or a monolith, using techniques known to one skilled in the art. The washcoating procedure comprises dipping the support into the slurry of the aluminum oxide sources and, if being employed, the precursors of the stabilizing agent. Excess slurry may be removed from the support using an air knife according to procedures well known to one skilled in the art. The catalyst-coated support is then dried and calcined as hereinbefore described. The washcoating procedure can be repeated as often as desired until the desired loading of catalyst on the support is achieved. It is preferred that the amount of catalyst coated onto the support be in the range of from about 25 to about 350 g/liter. The aforementioned washcoating procedure may also be employed to apply a stabilizing agent to the catalyst, or if a precursor of the stabilizing agent was present in the slurry of the alumina sources, to apply one or more additional stabilizing agents to the supported catalyst.

As discussed above, the catalyst of the present invention comprises alumina prepared from aluminum nitrate. Aluminum nitrate may be used as the sole source of the alumina for the catalyst. However, as also discussed above, the alumina nitrate may be supplemented with one or more additional alumina sources or precursors. In such cases, the aluminum nitrate is preferably present in an amount of from 1% to 25%, more preferably from 5% to 15% by weight of the total amount of the alumina sources. The preferred way of preparing the alumina oxide is to prepare a slurry of pseudoboehmite and aluminum nitrate in a mixer.

An alternative method for preparing a stabilized aluminum oxide catalyst consists of impregnating alumina prepared as hereinbefore described with a precursor of the stabilizing agent using impregnation techniques known to one skilled in the art, such as incipient wetness, precipitation, ion exchange. Once the impregnation has been completed, the resulting material is dried and calcined at a temperature sufficient to decompose the precursor of the stabilizer. The resulting catalyst is activated by heating to a temperature of from 600 to 1,000° C. for from about 0.5 and 600 hours, with the duration of the heating being dependent upon the temperature. The activation step may be omitted if the intended operating temperature of the catalyst in the process of the present invention is greater than about 600° C., as activation of the catalyst will occur upon the first use of the catalyst.

The catalyst may be prepared and employed in any configuration or size which sufficiently exposes the catalyst to the perfluoroalkanes in the gas stream being treated. The catalyst may be configured in one of the many typical and well-known forms, for example, pellets, granules, rings, spheres or cylinders. Alternatively, the catalyst may take the form of a coating or an inert carrier, such as ceramic foams, spheres or monoliths. The monolithic form may be preferred when it is desired to reduce the pressure drop through the system or minimize attrition or dusting.

The various aspects of the present invention will now be further described by way of the following specific examples, which are presented for illustrative purposes only and are not intended to limit or restrict the scope of the present invention. Examples IV, V, VIII, IX and X are examples of the present invention, while Examples, I, II, III, VI and VII are for comparative purposes only.

The compositions of the catalysts reported in the following examples of the present invention are indicated in percent by weight and have been calculated based upon the elements described. In cases in which the metal component or components were added by wet impregnation techniques, the weight percent of the metal component(s) have been calculated based on the concentration of meal(s) within the impregnation solution and the amount of impregnation solution used to prepare the catalyst. When referring to the metal component or components added to the slurry of aluminum oxide sources, the weight percent of the metal component(s) was calculated from the amount of aluminum oxide precursor and the amount of metal(s) present within the slurry, and the weight loss upon ignition of the aluminum oxide precursor as reported by the manufacture.

The concentrations of carbon monoxide, carbon dioxide, and perfluoroalkane in the reactor effluent in the following examples were determined using gas chromotographic techniques employing packed columns and both thermal conductivity and flame ionization detectors. These analytical techniques are well known to one skilled in the art.

EXAMPLE I

Aluminum oxide was prepared by first adding approximately 1.0 liters of distilled, deionized water to a 3.5 liter jar and stirring with a laboratory scale mixer. 500 g of pseudoboehmite alumina was slowly added to the water while stirring. The pH of the slurry was adjusted to approximately 3.3 using nitric acid, and the slurry was allowed to stir overnight. In the morning, the slurry was covered and allowed to age for three days. Following aging, the slurry was mixed for approximately one hour using the laboratory scale mixer, then poured into a drying pan. The drying pan containing the slurry was placed into an oven and heated to between 110 and 125° C. until dry. Following drying, the resulting solids were calcined at 535° C. for two hours.

The catalyst was evaluated for stability by exposing 2.4 g (6.0 cm$^2$) of 12–20 mesh catalyst to a gas stream containing 500 ppm hexafluoroethane ($C_2F_6$) 2.8 volume percent water with the balance air at a gas hourly space velocity of 1,800 h$^{-1}$ at 700° C. The conversion of C2F6 decreased from 95% to less than 90% in 18.5 hours and to less than 80% in 32.5 hours. The conversion was less than 60% upon termination of the run at 52.5 hours. Results of this test demonstrate that while aluminum oxide is active to decompose perfluoroalkanes, the stability of the catalyst places severe limitations on the commercial viability of the catalyst.

EXAMPLE II

A catalyst was prepared containing 3% zirconium oxide ($ZrO_2$), the balance being alumina ($Al_2O_3$) by first adding approximately 1.5 liters of distilled, deionized water to a 3.5 liter jar and stirring with a laboratory scale mixer. To the water was added 1.5 kg pseudoboehmite while stirring. Thereafter, 105 g of a zirconium oxynitrate solution (20% by weight $ZrO_2$) was added. The pH of the slurry was adjusted to approximately 3.5 using nitric acid, and the slurry was allowed to stir overnight. In the morning, the slurry was covered and allowed to age for three days. Following aging, the was slurry poured into a drying pan. The drying pan containing the slurry was placed into an oven and heated to between 100 and 125° C. until dry. Following drying, the resulting solids were calcined at 535° C. for two hours.

120 cm$^3$ of the catalyst as 6/10 mesh granules were placed in one inch outside diameter fixed bed catalyst reactor and exposed to 500 ppm $C_2F_6$, 2.1% water in air at 700° C. at a gas hourly space velocity of 1,800 h$^{-1}$. The conversion of $C_2F_6$ increased from 95 to 98% over the first 10 hours of operation. This conversion was maintained for 150 hours, at which point the conversion of $C_2F_6$ began to decrease. After 213 hours, the conversion had decreased to less than 90%. The only carbon containing reaction product detected in the effluent stream was $CO_2$.

This example demonstrates that, while an alumina catalyst stabilized with zirconium is a more stable catalyst than the catalyst of Example I, consisting of alumina alone, the long term stability of the catalyst under the operating conditions of the process nevertheless significantly shorter than is desirable for a commercially applicable catalyst.

EXAMPLE III

The catalyst in Example II was further evaluated for stability by exposing 50 cm$^3$ of 6/10 mesh catalyst in a one inch outside diameter fixed bed reactor to 2,000 ppm $C_2F_6$, 3.2% water in air at a gas hourly space velocity of 5,400 h$^{-1}$. The test was performed at 782° C. The conversion of $C_2F_6$ remained stable at about 92% over the first 42 hours of operation. Following this period, the conversion of $C_2F_6$ began to decrease. Following 93 hours, the conversion had decreased to 54%. The only carbon containing reaction product detected in the effluent stream was carbon dioxide.

EXAMPLE IV

A catalyst consisting of 50% alumina ($Al_2O_3$), 50% zirconium oxide ($ZrO_2$) by weight was prepared by combing 1,000 g of zirconium oxynitrate solution (20% zirconium) with 1,200 g of aluminum nitrate in a mixer. The solution was allowed to mix for 30 minutes. The pH of the solution was then adjusted to 8.0 by the addition of an aqueous solution of ammonium hydroxide. The resulting gel was then allowed to age at room temperature for 24 hours. After aging, the gel was placed in a pan and dried at 110° C. for three days. Following drying, the gel was calcined for 2 hours at 535° C.

The catalyst was crushed to 6/10 mesh particles and placed in a one inch outside diameter fixed bed reactor. The catalyst was heated to 750° C. and exposed to 500 ppm $CF_4$, 3.2% water in air at a gas hourly space velocity of 1,800 h$^{-1}$. The conversion of $CF_4$ remained stable at about 98% throughout the duration of the 1,000 hour run. The only carbon containing reaction product detected in the effluent stream was carbon dioxide.

This example demonstrates the significant improvement obtainable in the stability of the alumina catalyst in the decomposition of perfluoroalkanes when the alumina is prepared using aluminum nitrate as an alumina precursor or source.

EXAMPLE V

A catalyst comprising 3% zirconium oxide ($ZrO_2$), the balance being alumnia ($Al_2O_3$) catalyst was prepared by adding 1.6 liters of distilled, deionized water to a one gallon jar. To the water was added 600 g of pseudoboehmite alumina. To the resulting slurry was added 91.4 g of aluminum nitrate and an additional 500 ml of distilled, deionized water. An additional 20.5 g of aluminum nitrate and 100 ml of ammonia hydroxide solution were then added. To the slurry was then added 68 g of zirconium oxynitrate solution (20% ZrO2) and 500 ml of distilled, deionized water. To the resulting slurry was next added an additional 25.1 g of aluminum nitrate. At this point the slurry rapidly gelled. The resulting gel was allowed to age for three days at room temperature. Following aging, the gel was placed into a pan and dried at 110° C. for two days, then calcined at 535° C. for two hours.

The resulting catalyst was then crushed to 6/10 mesh particles. 150 cm$^3$ of catalyst was placed in a one inch outside diameter reactor and heated to 660° C. The catalyst was exposed to a stream containing 500 ppm $C_2F_6$ in humid (3.2% water) air for 1,000 hours at a gas hourly space velocity of 1,800 hr$^{-1}$. Over the course of the run, the conversion of $C_2F_6$ remained stable at greater than 95%. The only carbon containing reaction product detected in the effluent stream was carbon dioxide.

A further stability evaluation was performed by exposing 50 cm$^3$ of the catalyst to a stream of gas containing 2,000 ppm $C_2F_6$, 3.2% water in air at a gas hourly space velocity of 5,400 h$^{-1}$ in a one inch diameter reactor. The test was performed at 785° C. The conversion of $C_2F_6$ remained constant at 95% over the first 93 hours of the test. Following this period, the conversion of $C_2F_6$ decreased to 87% over the next 24 hours, at which point the test was terminated. The only carbon containing reaction product detected in the effluent stream was carbon dioxide.

EXAMPLE VI

The catalyst described in Example II was impregnated with 5% cobalt using cobalt acetate using an incipient wetness technique.

The resulting catalyst was evaluated for stability by exposing 150 cm3 of 6/10 mesh catalysts to an air stream containing 1,000 ppm $C_2F_6$, 3.2% water at 700° C. and a gas hourly space velocity of 1,800 $h^{-1}$. The conversion of $C_2F_6$ increased from 90 to 96% over the first 200 hours of the run, then remained constant throughout the duration of the 1,000 hour run. The only carbon containing reaction product detected in the effluent stream was carbon dioxide.

EXAMPLE VII

The catalyst described in Example VI was further evaluated for stability by exposing 150 cm3 of 6/10 mesh catalyst to an air stream comprising 2,000 ppm $C_2F_6$, 3.1% water at a 725° C. and a gas hourly space velocity of 1,800 $h^{-1}$. The conversion of $C_2F_6$ remained constant over the first 350 hours of operation. Following this period of time, the conversion of $C_2F_6$ began to decrease, to 91% upon termination of the run following 500 hours of operation. The only carbon containing reaction product detected in the effluent stream was $CO_2$.

EXAMPLE VIII

The catalyst in Example V was impregnated to 5% cobalt using cobalt acetate using an incipient wetness technique.

The resulting catalyst was evaluated for stability by exposing 50 $cm^3$ of 6/10 mesh catalyst to an air stream containing 2,000 ppm $C_2F_6$, 3.2% water at a 775° C. and a gas hourly space velocity of 5,400 $h^{-1}$. The conversion of $C_2F_6$ remained constant at 90% following 999 hours of continuous operation. The only carbon containing reaction product detected in the effluent stream was carbon dioxide.

This example demonstrates in improved stability obtained when using aluminum nitrate as a source for the alumina in the finished catalyst.

EXAMPLE IX

The catalyst of Example VIII was evaluated for its ability to destroy $CF_4$ in the absence of oxygen by placing 150 $cm^3$ of 6/10 mesh catalyst in a one inch outside diameter reactor and heating the reactor to about 750° C. Once at this temperature, the catalyst was exposed to 900 ppm $CF_4$ in humid (3.2% water) nitrogen (>99.99%) pure at a gas hourly space velocity of 1,800 $h^{-1}$. The initial temperature was maintained for approximately one hour. Following this time, the reactor was cooled and the effluent concentration of the perfluoroalkane was measured as a function of reaction temperature. The results of this test are summarized below in Table II. For comparison purposes, the same experiment was run, but replacing the nitrogen with air. The results of this experiment are also set out in Table II.

TABLE I

| Temperature ° C. | Conversion of $CF_4$ Humid Air | Conversion of $CF_4$ in Humid N2 |
| --- | --- | --- |
| 750 | >99.9% | >99.9% |
| 730 | >99.9% | >99.9% |
| 720 | >99.9% | >99.9% |
| 700 | >99.9% | >99.9% |
| 675 | 99.7% | >99.9% |
| 655 | 98.0% | 99.1% |
| 635 | 93.0% | 96.9% |
| 610 | 83.7% | 90.5% |
| 590 | 68.8% | 78.3% |
| 570 | 50.5% | 62.4% |
| 550 | 31.8% | 43.8% |

TABLE I-continued

| Temperature ° C. | Conversion of $CF_4$ Humid Air | Conversion of $CF_4$ in Humid N2 |
| --- | --- | --- |
| 530 | 19.5% | 27.3% |
| 505 | 10.3% | 15.2% |
| 485 | 5.2% | 8.4% |
| 465 | 2.8% | 4.4% |
| 445 | 1.6% | 1.8% |
| 425 | 0.0% | 1.0% |
| 510 | | 2.3% |

The catalyst of Example VIII was evaluated for its ability to decompose $CF_4$ in the presence of silicon tetrafluoride ($SiF_4$) by placing 150 $cm^3$ of 6/10 mesh catalyst in a one inch outside diameter reactor and heating the reactor to about 750° C. Once at this temperature, the catalyst was exposed to 300 ppm $CF_4$ and $SiF_4$ in humid (3.2% water) air at a gas hourly velocity of 1,800 $h^{-1}$. The initial temperature was maintained for approximately one hour. Following this time, the reactor was cooled and the effluent concentration of the perfluoroalkane was measured as a function of reaction temperature. The results of this test are summarized below in Table III below. For comparison purposes, the same experiment was conducted, but in the absence of silicon tetrafluoride. The results of this experiment are also set out in Table II.

TABLE II

| Temperature ° C. | Conversion of $CF_4$ | Conversion of $CF_4$ in $SiF_4$ |
| --- | --- | --- |
| 750 | >99.0% | >99.0% |
| 730 | >99.0% | >99.0% |
| 720 | >99.0% | >99.0% |
| 700 | >99.0% | >99.0% |
| 675 | >99.0% | >99.0% |
| 655 | >99.0% | >99.0% |
| 635 | 98.1% | 97.7% |
| 610 | 91.5% | 93.1% |
| 590 | 80.4% | 81.0% |
| 570 | 63.1% | 61.5% |
| 550 | 37.6% | 40.7% |
| 530 | 22.3% | 21.9% |
| 505 | 11.9% | 10.3% |
| 485 | 4.8% | 4.3% |
| 465 | 1.8% | 1.9% |
| 445 | 0.2% | 0.0% |
| 425 | 0.4% | 0.0% |

We claim:

1. A process for the decomposition of perfluoroalkanes, which process comprises:

providing a catalyst comprising alumina, said catalyst having been prepared by the steps of providing one or more sources of alumina, wherein at least one of said one or more sources is aluminum nitrate, and preparing said catalyst from said one or more sources of alumina; and contacting a gaseous stream containing one or more perfluoroalkanes with said catalyst at an elevated temperature in the presence of water.

2. A process according to claim 1, wherein the gaseous stream comprises an oxidizing agent.

3. A process according to claim 2, wherein the oxidizing agent is selected from the group consisting of oxygen, oxides of nitrogen and oxides of sulfur.

4. A process according to claim 3, wherein the oxidizing agent is oxygen.

5. A process according to claim 1, wherein the gaseous stream is contacted with the catalyst at a temperature of from 400 to 1000° C.

6. A process according to claim 1, wherein the gaseous stream is contacted with the catalyst at a pressure of from atmospheric pressure to 500 psi.

7. A process according to claim 1, wherein the gaseous stream is contacted with the catalyst at a gas hourly space velocity of from 500 to 50,000 h$^{-1}$.

8. A process according to claim 1, wherein the gaseous stream also comprises compounds selected from the group consisting of perfluoroalkenes, hydrofluorocarbons and hydrocarbons.

9. A process according to claim 1, wherein the gaseous stream comprises perfluoroalkanes injected into the stream in the liquid state.

10. A process according to claim 1, wherein the catalyst comprises alumina prepared from two or more sources, one of which is aluminum nitrate.

11. A process according to claim 10, wherein the alumina prepared from pseudoboehmite and aluminum nitrate.

12. A process according to claim 1, wherein the catalyst comprises a stabilizing agent.

13. A process according to claim 12, wherein the stabilizing agent is selected from the group consisting of barium, calcium, cerium, phosphorus, chromium, cobalt, iron, lanthanum, magnesium, nickel, tin, titanium, zirconium and compounds thereof.

14. A process according to claim 13, wherein the catalyst comprises zirconium oxide and cobalt.

* * * * *